US010688457B2

(12) United States Patent
Jensen et al.

(10) Patent No.: US 10,688,457 B2
(45) Date of Patent: Jun. 23, 2020

(54) ICE FISHING HOLE PRESERVATION APPARATUS

(71) Applicants: Arthur Jensen, Monticello, MN (US); Robert Natzic, White Rock, NM (US)

(72) Inventors: Arthur Jensen, Monticello, MN (US); Robert Natzic, White Rock, NM (US)

( * ) Notice: Subject to any disclaimer, the term of this patent is extended or adjusted under 35 U.S.C. 154(b) by 87 days.

(21) Appl. No.: 15/920,221

(22) Filed: Mar. 13, 2018

(65) Prior Publication Data

US 2019/0282977 A1    Sep. 19, 2019

(51) Int. Cl.
| | | |
|---|---|---|
| *B01F 5/10* | (2006.01) | |
| *A01K 97/01* | (2006.01) | |
| *A01K 97/12* | (2006.01) | |
| *B01F 15/00* | (2006.01) | |
| *F04D 29/18* | (2006.01) | |
| *F04D 29/52* | (2006.01) | |
| *F04D 13/06* | (2006.01) | |

(52) U.S. Cl.
CPC ............. *B01F 5/108* (2013.01); *A01K 97/01* (2013.01); *A01K 97/125* (2013.01); *B01F 15/00538* (2013.01); *B01F 15/00662* (2013.01); *F04D 29/181* (2013.01); *F04D 13/06* (2013.01); *F04D 29/528* (2013.01)

(58) Field of Classification Search
CPC .......... A01K 97/01; E02B 1/003; E02B 15/02
See application file for complete search history.

(56) References Cited

U.S. PATENT DOCUMENTS

| | | | |
|---|---|---|---|
| 3,637,196 A | 1/1972 | Kaelin | |
| 4,455,232 A | 6/1984 | Reid | |
| 4,462,180 A | 7/1984 | Scott | |
| 5,005,364 A | 4/1991 | Nelson | |
| 5,419,073 A | 5/1995 | Kline, Sr. | |
| 5,540,009 A | 7/1996 | Sykes | |
| 5,844,210 A | 12/1998 | Dowdle | |
| 5,862,303 A | 1/1999 | Adar et al. | |
| 6,050,550 A | 4/2000 | Burgess | |
| 6,079,406 A | 6/2000 | Bryzek | |
| 6,093,374 A | 6/2000 | Bukowsky | |
| 6,222,165 B1 | 4/2001 | Schwarzkopf | |
| 6,432,302 B1 | 8/2002 | Obritsch et al. | |
| 6,655,663 B2 | 12/2003 | Vento | |
| 7,162,831 B1 | 1/2007 | Morton et al. | |
| 7,201,621 B2 | 4/2007 | Jones | |
| 7,530,330 B1 | 5/2009 | Valle | |
| 8,057,091 B2 | 11/2011 | Tormaschy et al. | |
| 8,226,292 B1 | 7/2012 | Walter et al. | |
| 8,425,109 B2 * | 4/2013 | Foss ...................... | A01K 97/01 261/84 |
| 8,500,321 B2 | 8/2013 | Simnioniw et al. | |
| 8,622,706 B2 | 1/2014 | Burgess et al. | |
| 8,740,193 B2 | 6/2014 | St. Lawrence | |
| 8,950,104 B2 | 2/2015 | Weatherton | |
| 9,095,130 B2 | 8/2015 | Coulson | |
| 2005/0204610 A1 | 9/2005 | Bogart et al. | |

(Continued)

*Primary Examiner* — Elizabeth Insler
(74) *Attorney, Agent, or Firm* — Haugen Law Firm PLLP

(57) ABSTRACT

An apparatus is described for reducing formation of ice in an ice fishing hole. The apparatus includes low voltage variable speed motor contained within a housing that draws water into and up through the housing and out of the housing through a matrix of multiple rows and columns of holes that form the water outlet.

18 Claims, 14 Drawing Sheets

(56) References Cited

U.S. PATENT DOCUMENTS

| | | |
|---|---|---|
| 2005/0249852 A1 | 11/2005 | Smith |
| 2007/0014680 A1 | 1/2007 | Gifford et al. |
| 2010/0039061 A1 | 2/2010 | Rosenbaum |
| 2011/0186133 A1 | 8/2011 | Hiatt, Jr. et al. |
| 2013/0199658 A1* | 8/2013 | Henley .................. A01K 97/01 138/96 R |
| 2015/0152618 A1 | 6/2015 | Bertagnolli |
| 2017/0335531 A1* | 11/2017 | Smothers ................ E02B 1/003 |

* cited by examiner

ICE FISHING HOLE PRESERVATION APPARATUS

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

The present invention relates to an apparatus and method to keep an ice fishing hole from freezing during subzero Fahrenheit temperatures. The ice fishing hole preservation apparatus of the present invention circulates lake water in the ice fishing hole without unnecessarily interfering with the fishing line or bobber. The preservation apparatus is also compatible for simultaneous use with sonar flashers, tip ups, underwater cameras, and other ancillary ice fishing equipment.

BACKGROUND

During the winter months in many northern climates the surface of a lake will freeze over with a depth of ice sometimes exceeding 24 inches. Avid anglers continue to fish during these winter months by cutting holes through the ice and catching fish through these holes. The air surface temperature is typically below 32 degrees Fahrenheit which has a tendency to continually refreeze the water in the fishing holes unless proactive steps are taken to keep the water in the hole from freezing. At times, it may become necessary for the angler to regularly skim the forming ice off the water surface to avoid a line frozen in the ice. Ice forming in the holes is undesirable and distracts the angler from focusing on catching fish.

Various devices have been contrived in an attempt to prevent the fishing holes from freezing over. For example, heat sources have been described to heat the water in the ice fishing hole sufficiently so that the adjacent air is not able to freeze the water. These devices require significant sources of energy (either electric or from combustible materials) to transfer heat, warm the water, and maintain the air or water temperature above freezing over an extended period of time. These devices also tend to block the fishing hole and interfere with the angler's ability to fish through the hole unobstructed. Also, in order to avoid a likely entanglement, many of these devices are required to be removed from the hole before an attempt is made to pull a fish up through the hole.

Other attempts have been made to provide a way to conveniently fish through the ice during the winter months. By way of example, movable fishing shacks or houses have been constructed with one or more holes formed in the floor of the shack. The shack is positioned on the lake where the angler wants to fish and then the shack is typically lowered so that the floor of the shack is close to the ice surface. An auger is used to drill holes in the ice that are aligned with the holes in the floor. It is common for fishing shacks to have some form of propane or electric heater to increase the air temperature within the shack. However, the walls of the fishing shack are typically thin to reduce weight and are not well insulated. Hence, the fishing holes near the heater tend to stay open while the fishing holes at the opposite end of the shack tend to be more likely to freeze over.

Also, although the floor is close to the surface of the ice, outdoor air may circulate under the shack and the air temperature adjacent the hole may drop below the freezing temperature of water. Even in heated fishing shacks if the hole is left unattended a layer of ice may form over the hole and may freeze the fishing line into the ice. At night time, while the anglers sleep, it is especially common for a layer of ice to form in the hole. Open air fishing in conjunction with fishing from a house is also common, however, the holes tend to freeze over even faster without proactive management. It is desirable to reduce the likelihood that ice will form in a fishing hole so that the angler is able to focus on fishing rather than fishing hole maintenance. It is further desirable to maintain the fishing hole free of ice without interfering with the ability to fish in the hole and without requiring removal of a device from the hole prior to pulling a fish through the hole.

SUMMARY

Embodiments according to aspects of the invention include an apparatus for circulating water within the fishing hole to reduce the formation of ice on the surface of the water without creating a turbulent water surface. The apparatus of the invention is particularly well suited for simultaneous use with a sonar device and a fishing bobber in the same ice fishing hole. The apparatus of the present invention reduces formation of ice in the fishing hole without disturbing the bobber floating in the hole and without disturbing the sonar of a fish finder positioned within the ice fishing hole. Further, the present invention may remain positioned in the ice hole even when a fish is being pulled through the ice hole.

Embodiments according to aspects of the invention include an elongated tubular housing having an inlet and outlet, a motor contained within the housing, an impeller coupled to the end of a shaft of the motor, a housing mount arm and a controller electrically coupled to the motor. The elongated tubular housing has the inlet formed in a lower end of the housing. A plurality of apertures extend through a sidewall of the elongated tubular housing, wherein the plurality of apertures are aligned above a midpoint of the elongated tubular housing and form a matrix of rows and columns that combine to define an outlet of the housing. The impeller is coupled to an end of the shaft of the motor and is positioned within the housing above the inlet of the housing. The housing mount arm is height adjustable and is removably coupled to an exterior of the elongated tubular housing. The controller is contained within a casing that is combined with the mount arm.

The embodiments according to aspects of the invention may additionally affix the motor in the elongated tubular motor housing above the midpoint and above the outlet of the housing. Further, the motor contained within the housing may be of a low voltage, variable speed, dc motor type. Also, the interior of the elongated tubular housing may include a motor mount divider aligned above the midpoint of the elongated tubular housing. The housing mount arm may include a clamping end that engages with an external surface of the housing. The impeller may preferably have inner and outer concentric annular rings with blades mounted between the inner and outer annular rings. The blades may further form nonlinear sloped turbines of the impeller.

Another embodiment according to aspects of the invention includes an elongated tubular housing, a motor, an impeller, a mount arm, and a casing for a motor controller. The elongated tubular housing has an inlet formed in a lower end of the housing and has a plurality of apertures extending through a sidewall of the elongated tubular housing that form an outlet of the housing. The plurality of apertures are aligned above a midpoint of the elongated tubular housing and the apertures form a matrix of rows and columns that in combination define an outlet of the housing. The motor is contained within the housing and has a shaft extending from the motor, wherein the motor is affixed in the elongated tubular motor housing above the midpoint and outlet of the housing. The impeller is coupled to an end of the shaft of the motor. The impeller is positioned within the housing above the inlet of the housing, wherein the impeller has inner and outer concentric annular rings with blades mounted between the inner and outer annular rings. The housing mount arm is height adjustable and is removably coupled to an exterior of the elongated tubular housing. The housing mount arm includes a clamping end that engages with an external surface of the housing. The casing for a variable speed motor controller is combined with the mount arm such that the controller may be removed from the housing.

Additionally, the motor may be of the low voltage, variable speed, dc motor type. Further, the interior of the elongated tubular housing includes a motor mount divider aligned above the midpoint of the elongated tubular housing. Also, the blades of the impeller form nonlinear sloped turbines.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

Figure 1:
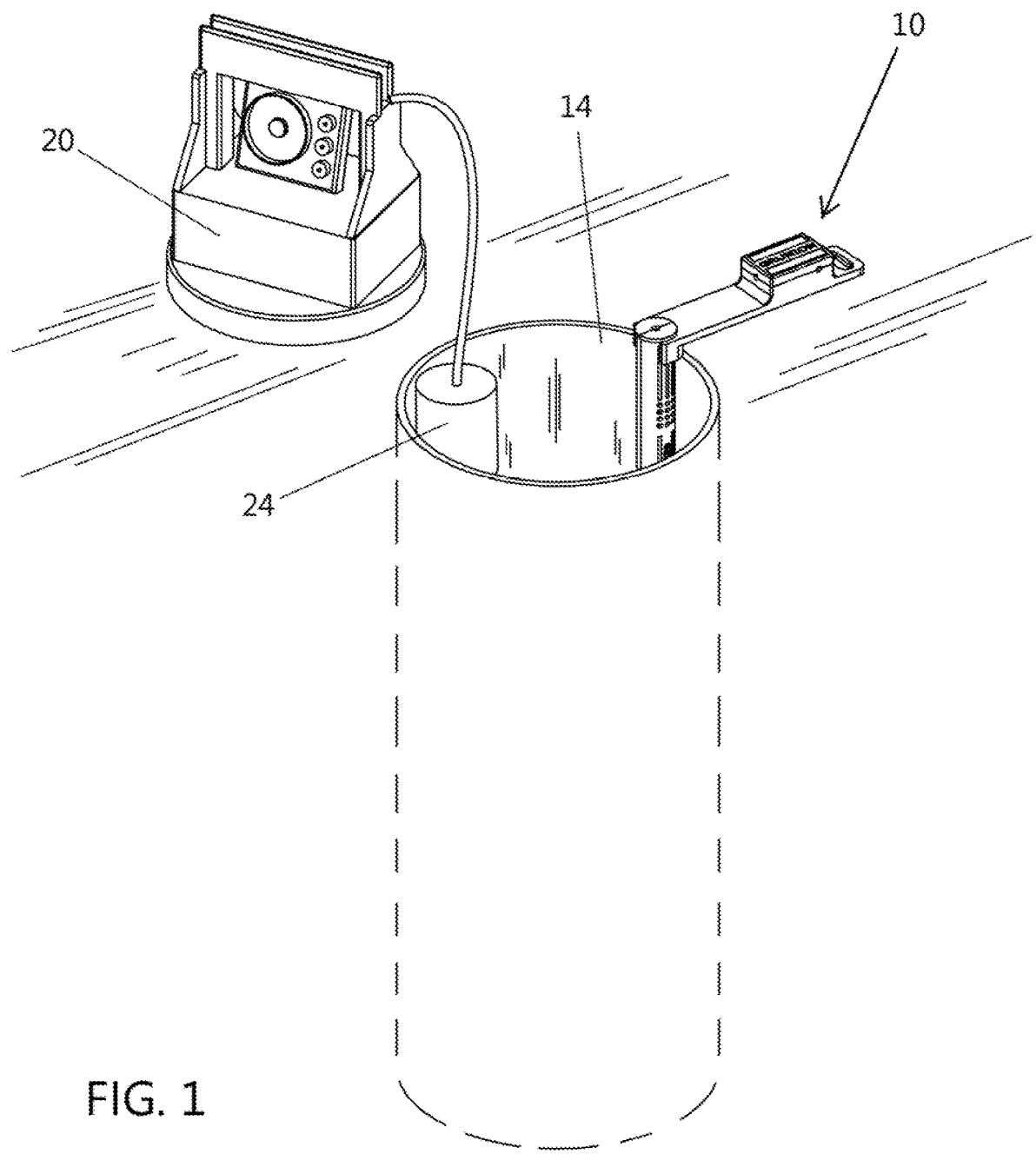
FIG. 1 is a perspective view of an ice fishing hole preservation apparatus of the present invention shown in use in an ice fishing hole.
Figure 2:
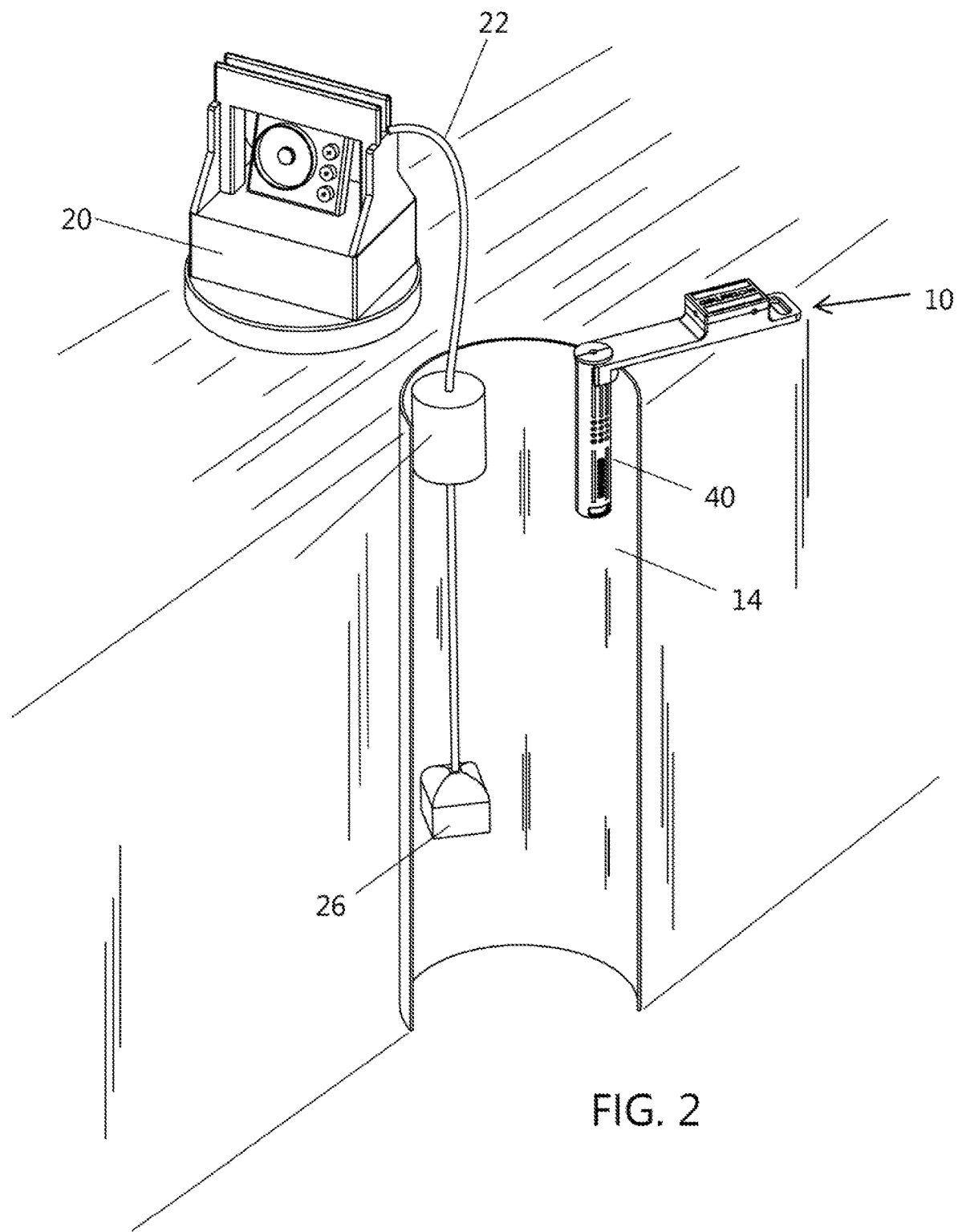
FIG. 2 is a partial sectional perspective view of the ice fishing hole of the type shown in FIG. 1 shown in use in an ice fishing hole.
Figure 3:
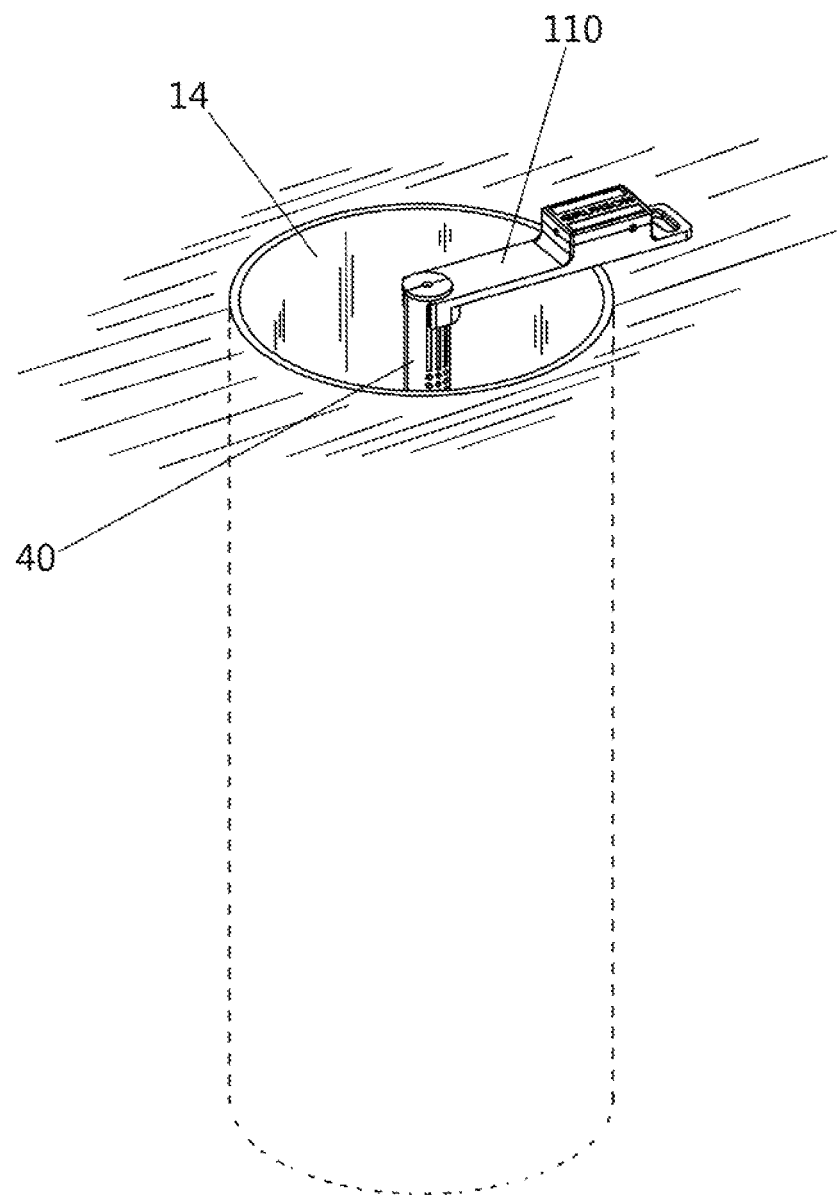
FIG. 3 is a perspective view of an ice fishing hole preservation apparatus shown centered in an ice fishing hole.
Figure 4:
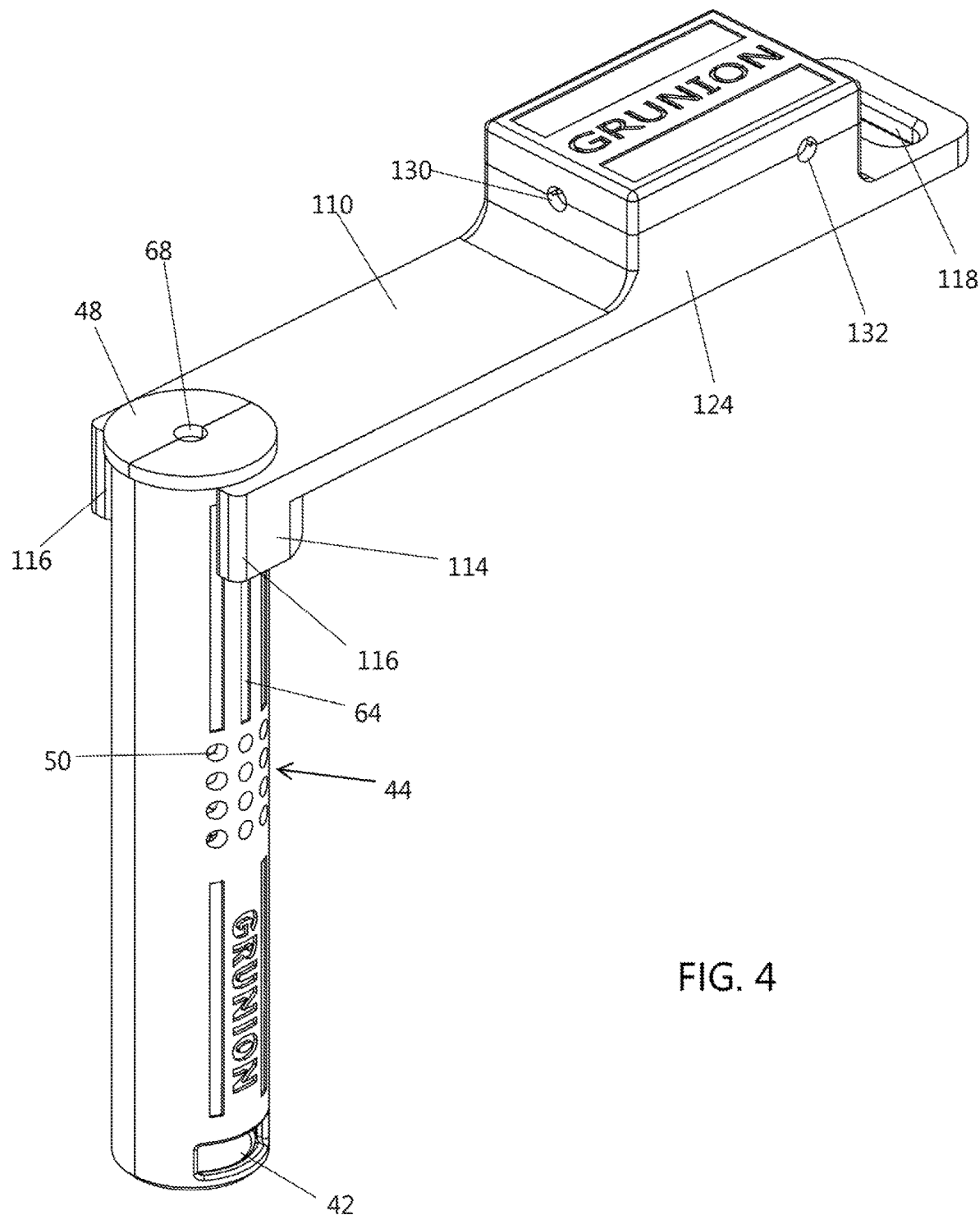
FIG. 4 is a front perspective view of an ice fishing hole preservation apparatus of the present invention.
Figure 5:
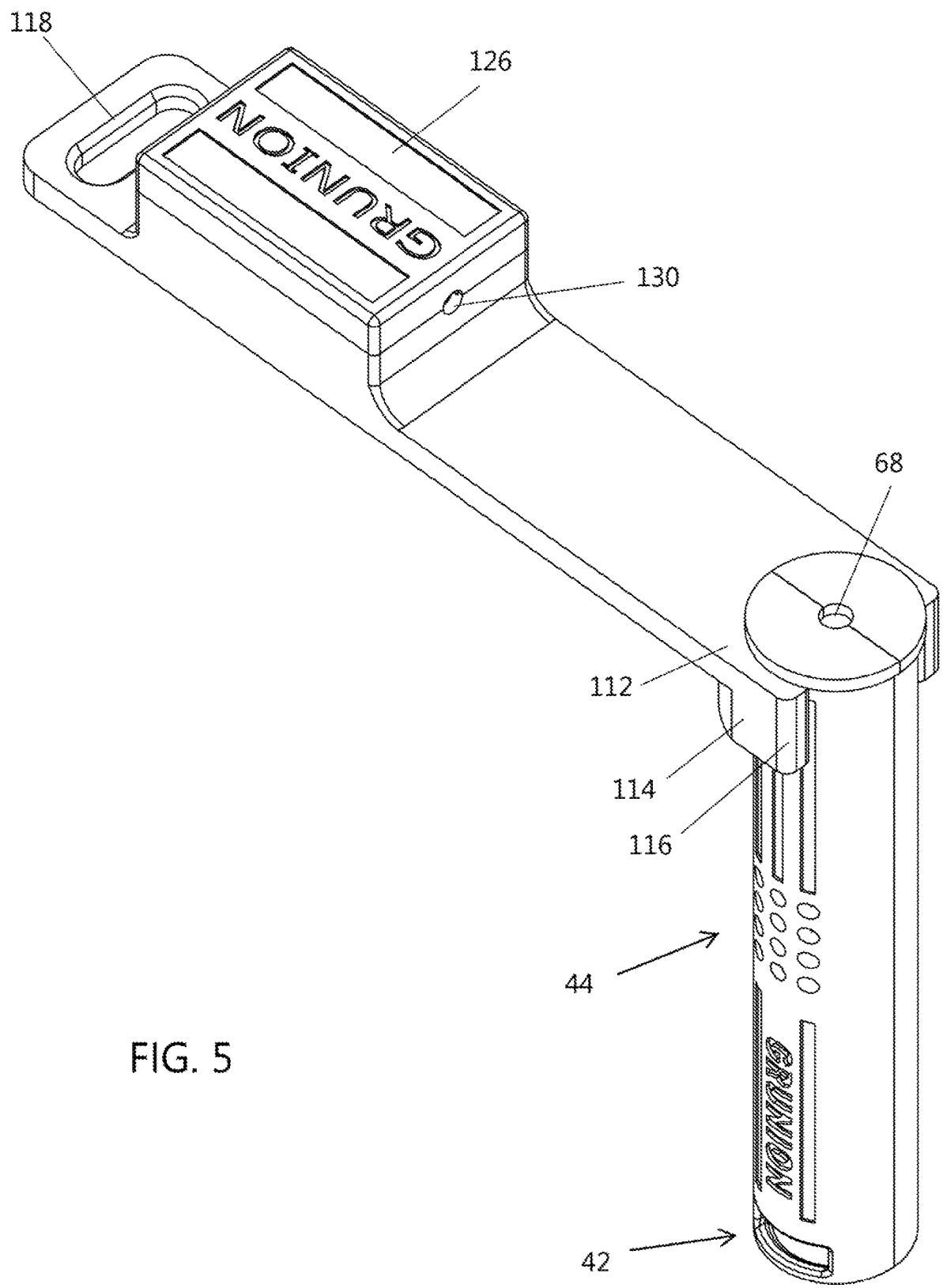
FIG. 5 is a back perspective view of an ice fishing hole preservation apparatus of the present invention.
Figure 6:
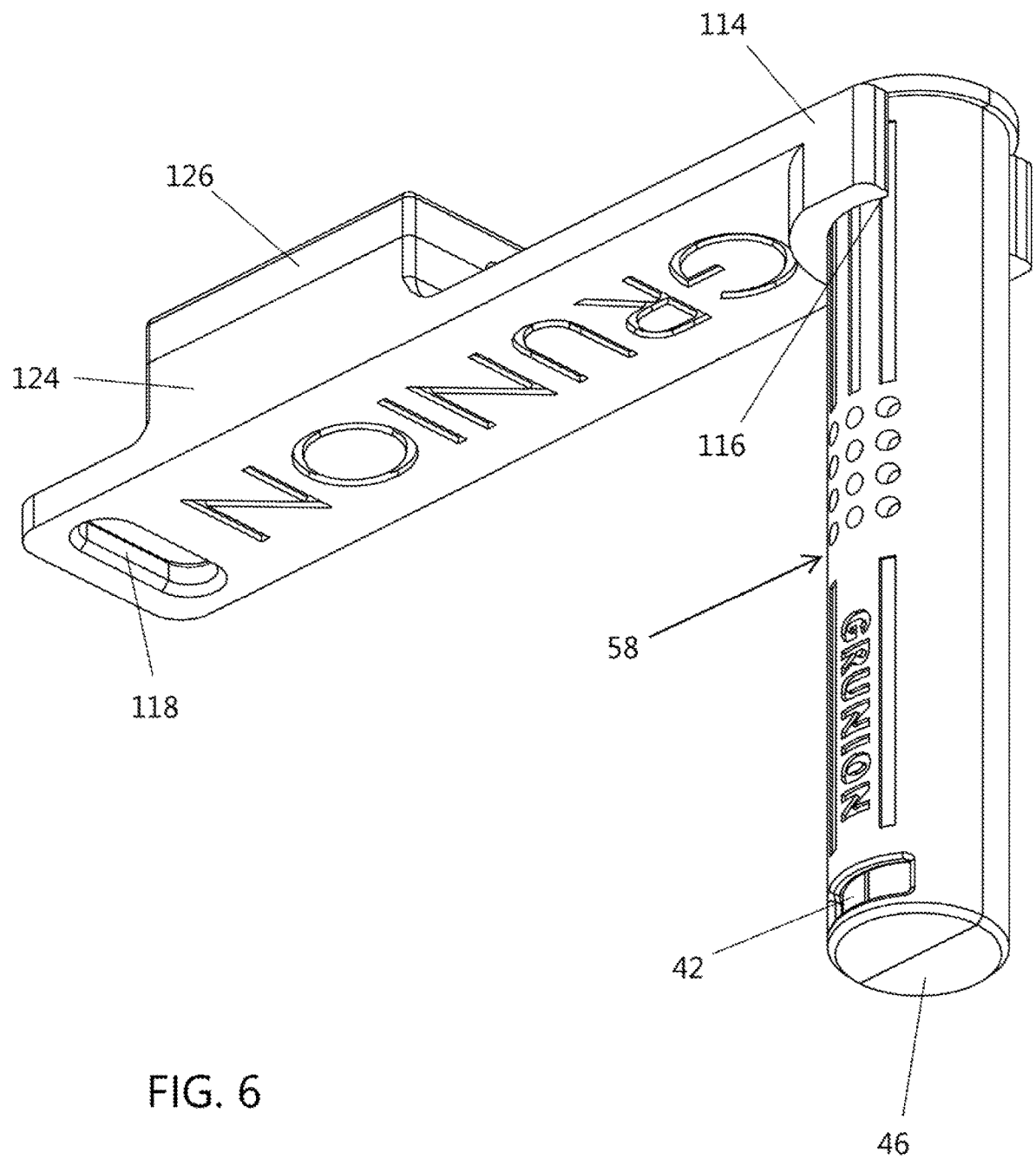
FIG. 6 is a bottom perspective view of an ice fishing hole preservation apparatus of the present invention.
Figure 7:
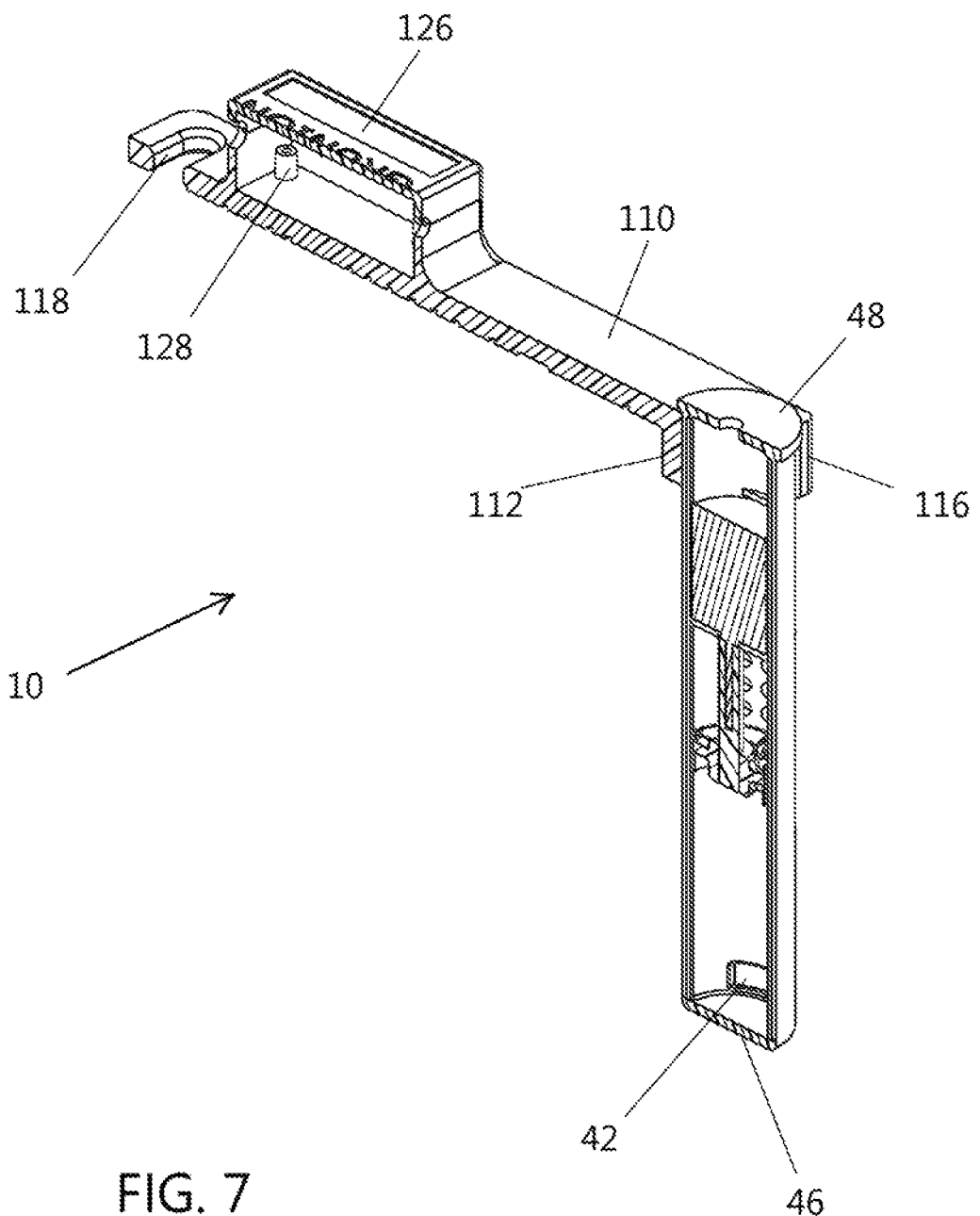
FIG. 7 is a partial sectional top perspective view of an ice fishing hole preservation apparatus of the present invention.
Figure 8:
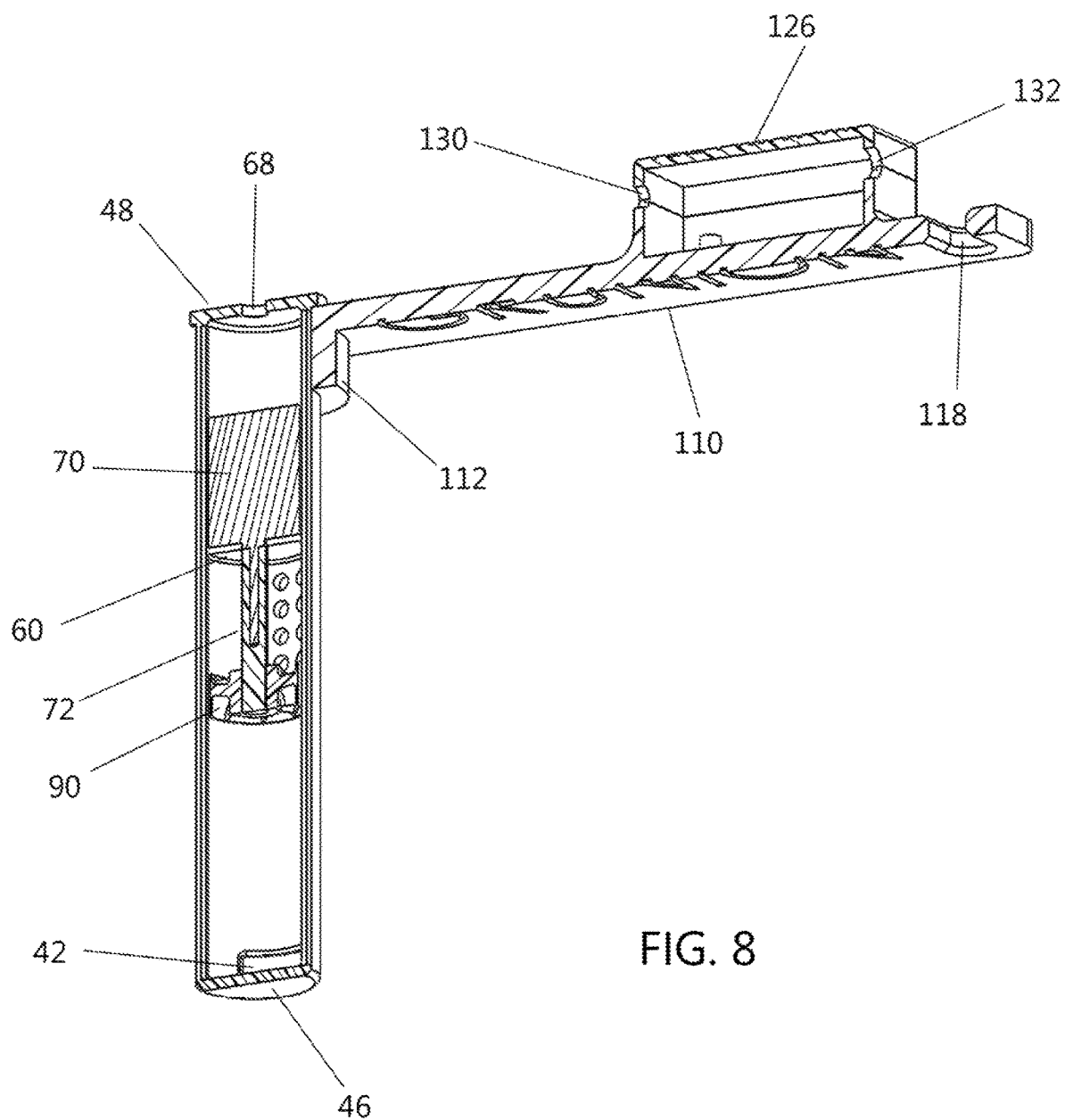
FIG. 8 is a partial sectional top perspective view of an ice fishing hole preservation apparatus of the present invention.

The ice fishing hole preservation apparatus 10 of the present invention generally includes an elongated small diameter tubular housing 40, motor 70, impeller 90, and mounting arm 110. FIGS. 1-2 illustrates a fishing hole preservation apparatus 10 of the present invention shown in use in an ice fishing hole 14 and in conjunction with a sonar flasher fish finder main unit 20. The fish finder 20 is shown having a sonar cable 22, float 24 and transducer 26 positioned along a side edge of the ice fishing hole 14. The preservation apparatus 10 is positioned along a side edge of the fishing hole 14 so that a majority of the hole remains open and free to pull a fish through the hole. Those skilled in the art will appreciate that the mount arm 110 of the preservation apparatus may be attached to the fish finder 20 and a clip may be included on a side of the mounting arm. The fish finder float may be eliminated and the sonar cable may be held in place in the fishing hole 14 by attaching to the clip of the mounting arm 110. In this manner, the fish finder 20 and hole preservation apparatus 10 are even less likely to interfere with the ability to pull a fish through the hole without entangling the fish with the apparatus 10 or fish finder 20. At times it may be desirable to simply keep the hole from freezing without using the hole for fishing. FIG. 3 illustrates the use of the preservation apparatus 10 aligned in the middle of the hole 14 to keep ice from forming on the surface of the water in the hole.

With reference to FIGS. 4-8 the assembled preservation apparatus 10 will be described in greater detail. Motor 70 is fixed within the housing 40 above a midpoint 58 of the housing and also above a matrix outlet 44. The motor has a shaft 72 that has an end coupled to impeller 90. The impeller 90 is positioned within the housing above the inlet 42 of the housing. The impeller 90 draws water into the inlet 42 of the housing and up through the elongated housing 40 and out the matrix of apertures 50 that form the outlet 44. Mount arm 110 clamps onto an external side of the housing and may be slid up or down along the side of the housing. In this manner the height of the inlet 42 and outlet 44 within the ice fishing hole 14 is adjustable. By way of example, it may be desirable to position the outlet 44 well below the ice hole water's surface to minimize the turbulence of water at the surface or alternatively it may be desirable to position the outlet 44 adjacent the water surface to create significant turbulence. The motor 70 is coupled to a controller that allows a user to adjust the rotation speed of the low voltage variable speed motor. The controller of known suitable construction is sealed within a casing 124 of the mount arm 110.

Figure 9:
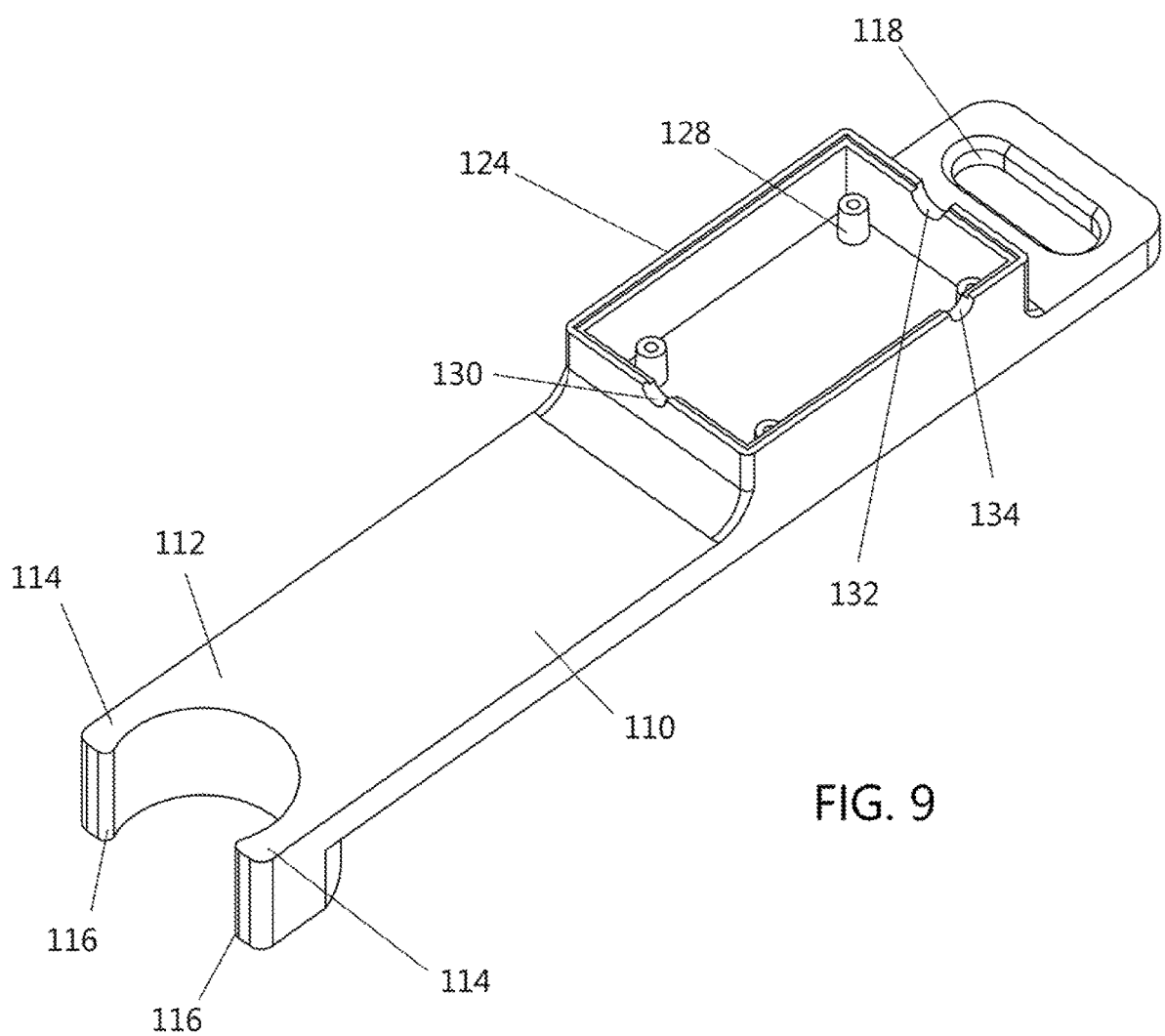
FIG. 9 is a perspective view of a housing mount arm in accordance with the present invention shown with the controller cover removed.

With further reference to FIG. 9, additional details of the mounting arm 110 is illustrated. The casing 124 includes a water tight cover 126 to seal an electronic circuit board comprising the controller within the casing 124. Circuit mounts 128 are provided to securely fasten the controller within the casing. Electrical conduit 130 is formed within the casing to allow electrical wiring to couple the controller to the motor 70. A power supply aperture 134 is formed within the housing to allow coupling of an external power supply to the controller. Alternatively the power supply for the DC motor 70 may be positioned within the housing above the motor 70. Additionally, aperture 132 is formed in the casing 124 to allow a control knob to extend from the casing 124. The control knob may be coupled to the controller and utilized to control the rotational speed of the motor 70. Alternatively, a digital switch may be utilized to control the rotational speed of the motor 70. The mount arm 10 further includes a clamping end 112 that includes flexible opposing fingers or clamp members 114. Nubs 116 are formed on the ends of the flexible clamp members 114. The nubs 116 snap into vertical slots 64 formed on an external surface of the housing 40. The nubs 116 help secure the mount arm 110 to the housing. A slot is formed on an opposing end to the mount arm 110. The slot may be utilized to secure the mount arm to the ice with an anchor screw or may be utilized to attach the mount arm 10 to the base of a sonar flasher fish finder main unit 20.

Figure 10:
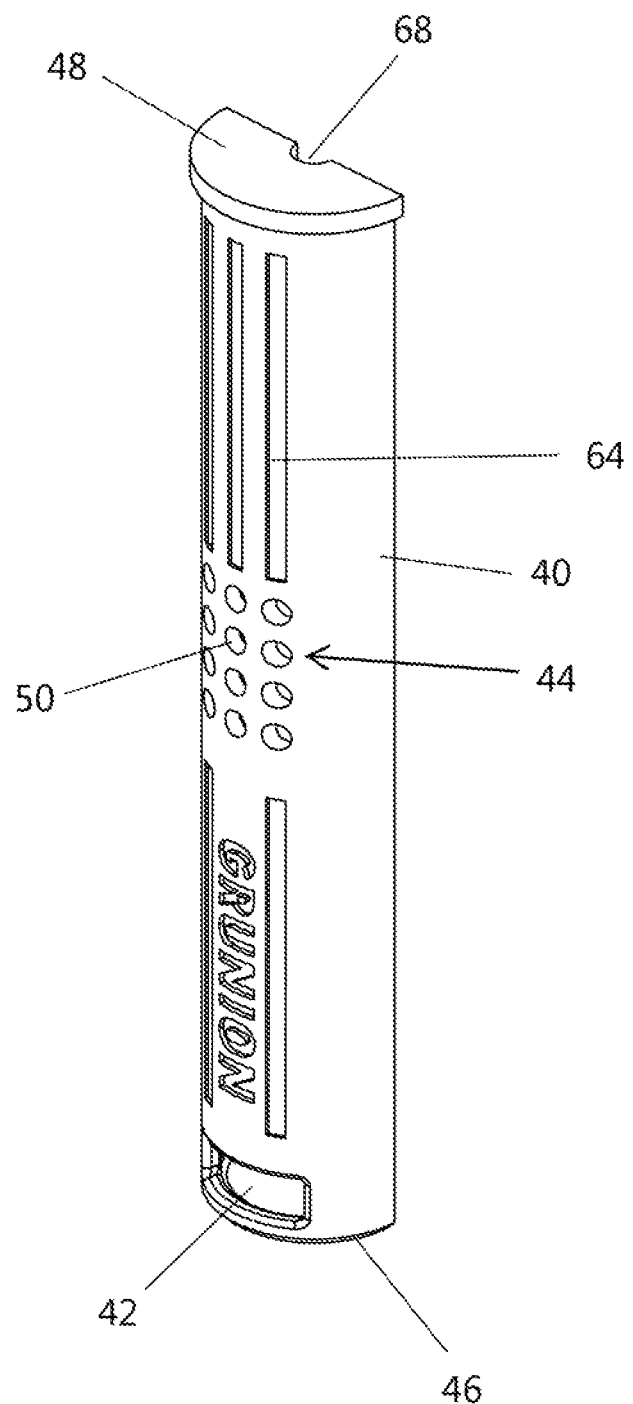
FIG. 10 is a perspective view of the exterior of half of an elongated tubular motor housing of the present invention.
Figure 11:
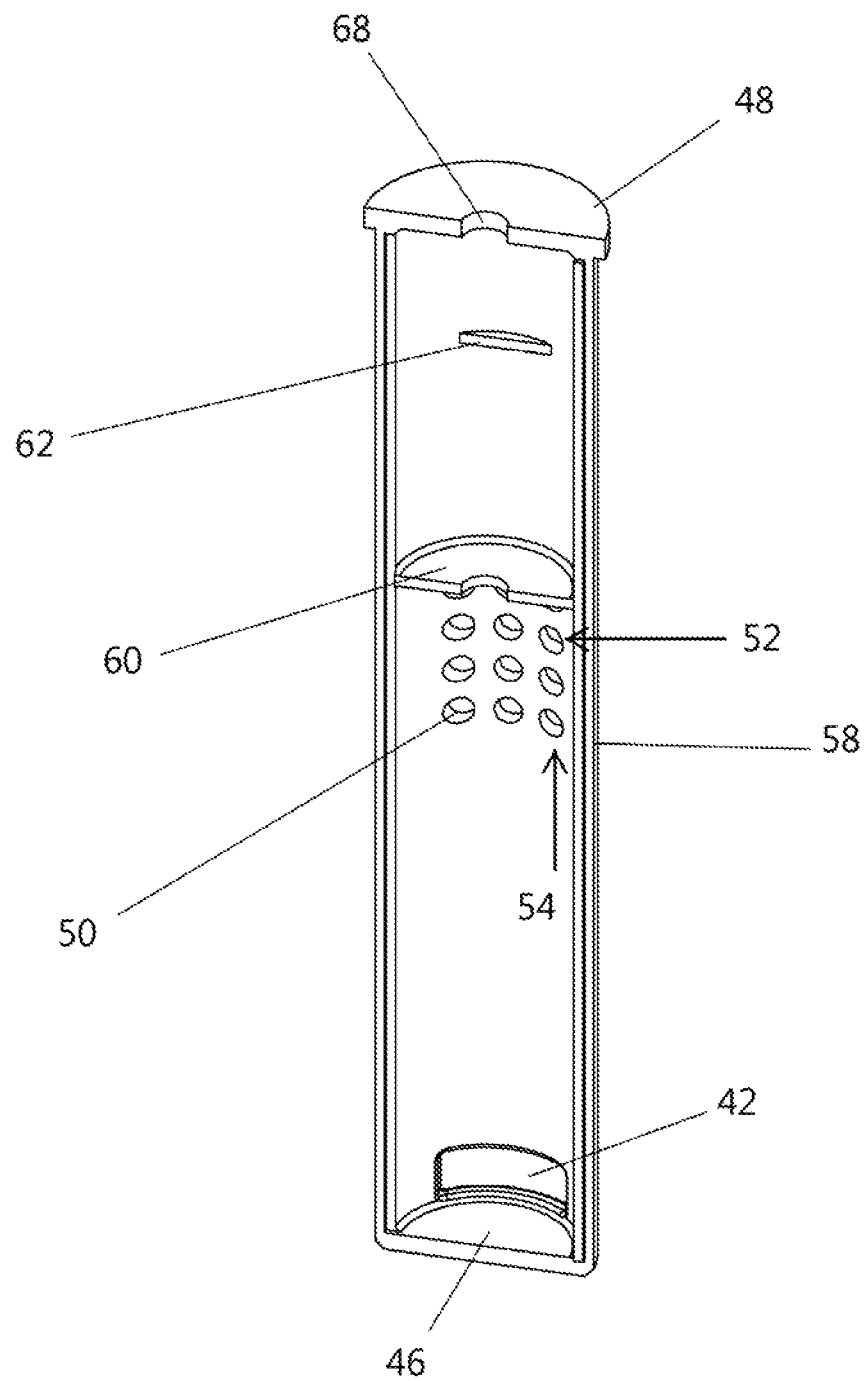
FIG. 11 is a perspective view of the interior of the elongated tubular motor housing of the type shown in FIG. 10.

With reference to FIGS. 10-11, additional details of the elongated tubular housing 40 is illustrated. The elongated tubular housing 40 includes an inlet 42 formed in a lower end 46 of the housing. A matrix of apertures 50 extend through the housing sidewall above a midpoint 58 of the elongated housing 40. The matrix of apertures forms the outlet 44 and includes a series of rows 52 and columns 54 of apertures 50. The motor 70 is fixed within the housing and is held in place by lower motor mount divider 60 and upper motor mount divider 62. The motor shaft 72 extends through an aperture 66 formed in the lower motor mount divider 60. An aperture 68 is formed in the upper end of the housing and acts as a conduit for electrical wiring coupling the motor 70 to the controller.

Figure 12:
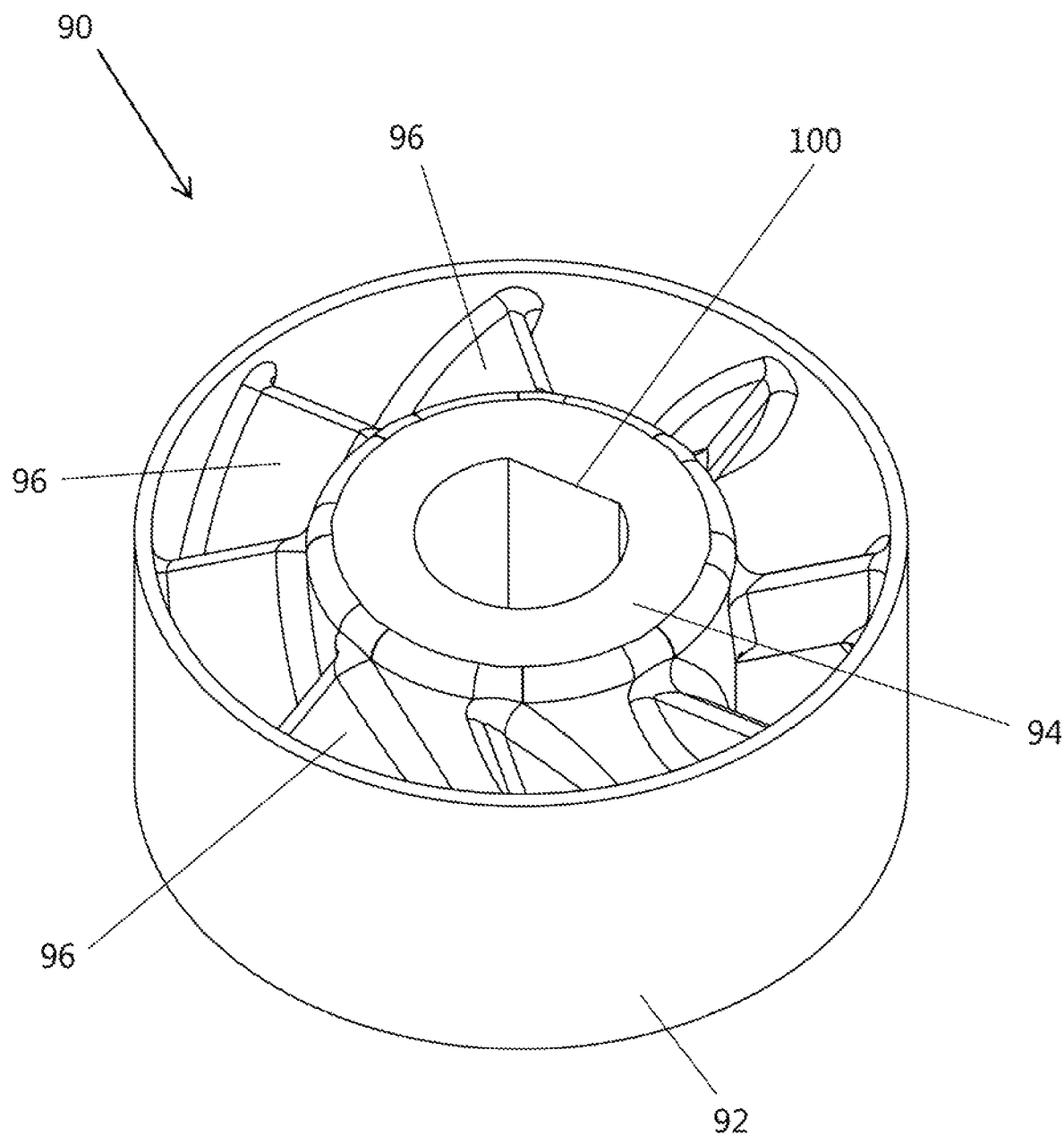
FIG. 12 is an top perspective view of the impeller of the present invention.
Figure 13:
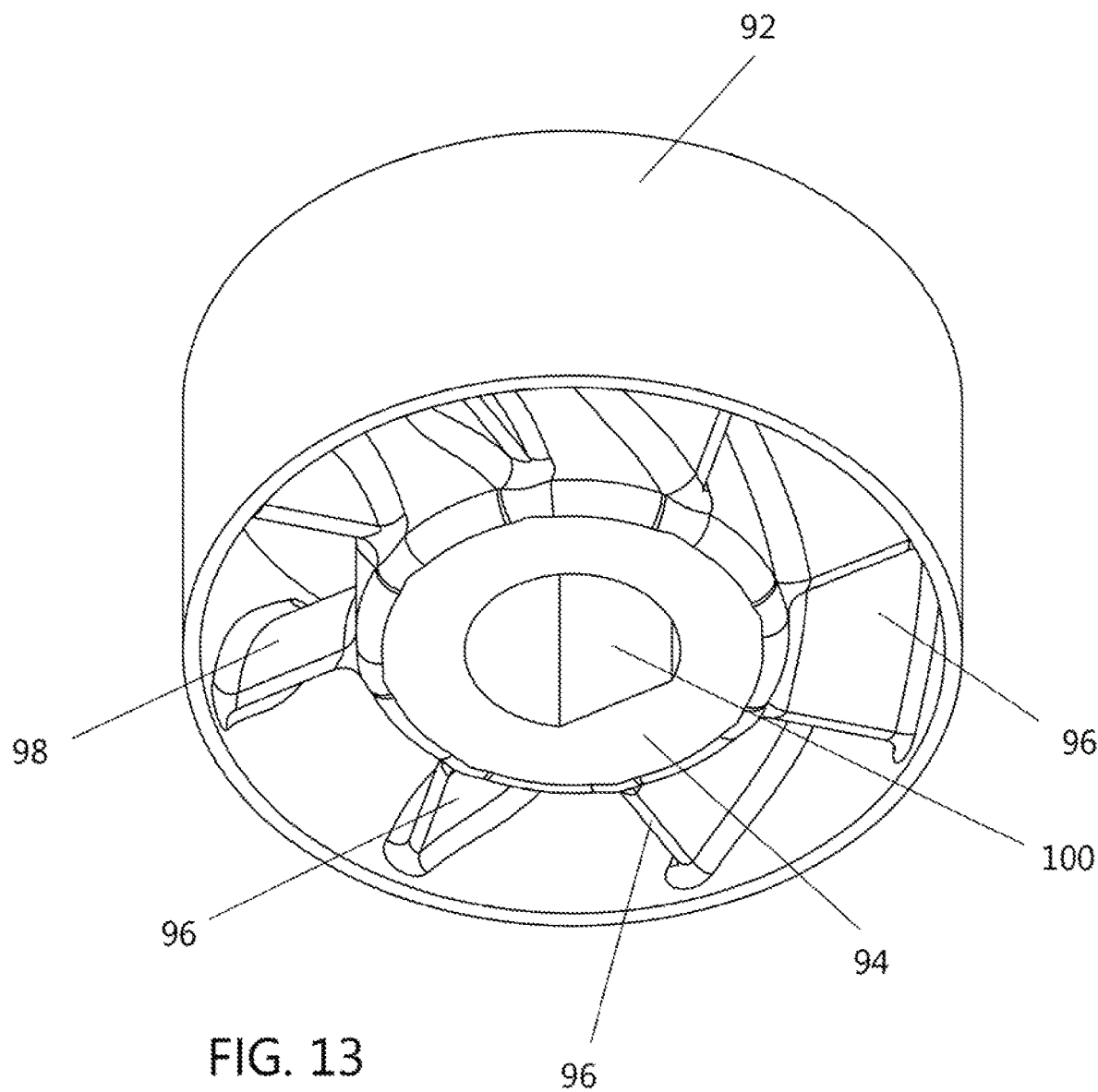
FIG. 13 is a bottom perspective view of the impeller of the type shown in FIG. 12.
Figure 14:
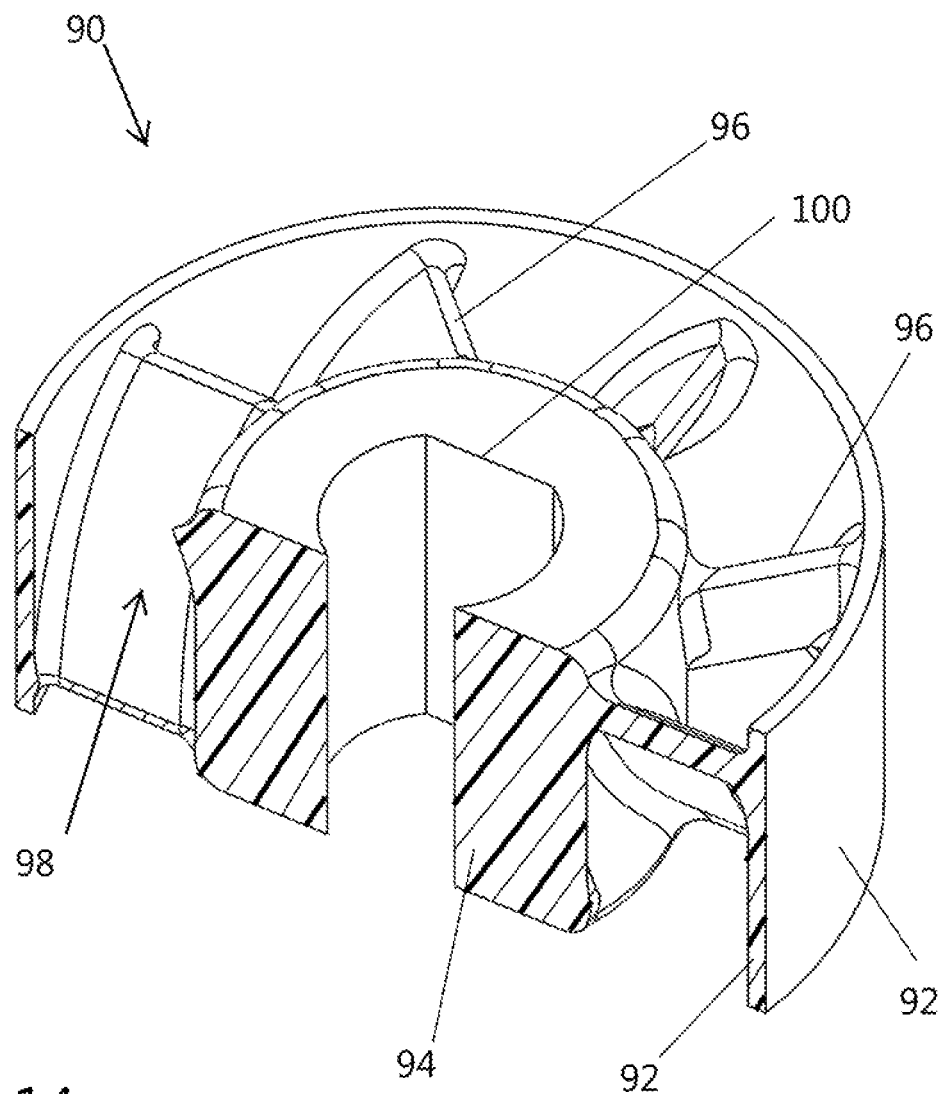
FIG. 14 is a partial sectional perspective view of an impeller of the present invention.

With reference to FIGS. 12-14, additional details of the impeller 90 is illustrated. The impeller 90 includes spaced apart concentric outer ring 92 and inner ring 94. Blades 96 interconnect the inner and outer rings. Each blade 96 is aligned at a slope and each blade further has a nonlinear surface 98. The slope and surface of the blades are selected to efficiently draw water through the inlet 42 of the housing and push water up through the housing and out the matrix outlet 44. A central aperture formed in the inner ring of the impeller includes a keyed or flat surface that engages a corresponding surface formed on the shaft 72 of the motor 70. In this manner the shaft 72 is locked in the impeller 90 and a rotation of the shaft 72 directly correlates with a rotation of the impeller 90.

In use, the user determines the desired amount of turbulence on the water surface of the ice fishing hole. The user then mounts the mount arm 110 to the ice or sonar flasher unit 20 and slides the housing up or down to position the matrix of apertures at a desired height within the fishing hole. One or more rows 52 of apertures may be exposed above a surface of the water to create a stream of water extending out of the housing 20. The controller may be used to increase or decrease the rotational speed of the motor. As the motor rotational speed is increased, the impeller will draw more water through the housing and the stream of water exiting the housing will exit the housing and extend a greater distance than when the rotational speed of the variable speed motor 70 is reduced. Further, when the temperature is significantly below freezing temperatures the speed of the variable speed motor 70 may be increased to circulate more water to reduce the ability of the water to freeze. Similarly, when the ambient temperature is near freezing the speed of the variable speed motor 70 may be reduced while still circulating enough water to maintain the ice fishing hole and reduce the ability of the water to freeze.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An apparatus for reducing formation of ice in an ice fishing hole, the apparatus comprising:
    an elongated tubular housing having an inlet formed in a lower end of the housing and having a plurality of apertures extending through a sidewall of the elongated tubular housing, the plurality of apertures forming a matrix of rows and columns of apertures that in combination define an outlet of the housing;
    a motor contained within the housing and having a shaft extending from the motor;
    an impeller coupled to an end of the shaft of the motor, the impeller being positioned within the housing entirely above the inlet of the housing;
    a height adjustable housing mount arm removably coupled to an exterior of the elongated tubular housing; and
    a casing for a variable speed motor controller for electrically coupling to the motor.

2. The apparatus as recited in claim 1, wherein the motor is affixed in the elongated tubular motor housing entirely above the midpoint and outlet of the housing.

3. The apparatus as recited in claim 1, wherein the motor is of the low voltage, variable speed, dc motor type.

4. The apparatus as recited in claim 1, wherein an interior of the elongated tubular housing includes a motor mount divider aligned entirely above the midpoint of the elongated tubular housing.

5. The apparatus as recited in claim 1, wherein the housing mount arm includes a clamping end that engages with an external surface of the housing.

6. The apparatus as recited in claim 1, wherein the impeller has inner and outer concentric annular rings with blades mounted between the inner and outer annular rings.

7. The apparatus as recited in claim 6, wherein the blades form nonlinear sloped turbines.

8. An apparatus for reducing formation of ice in an ice fishing hole, the apparatus comprising:
   an elongated tubular housing having an inlet formed in a lower end of the housing and having a plurality of apertures extending through a sidewall of the elongated tubular housing, the plurality of apertures forming a matrix of rows and columns of apertures that in combination define an outlet of the housing;
   a motor contained within the housing and having a shaft extending from the motor, wherein the motor is affixed in the elongated tubular motor housing entirely above the midpoint and outlet of the housing;
   an impeller coupled to an end of the shaft of the motor, the impeller being positioned within the housing entirely above the inlet of the housing;
   a height adjustable housing mount arm removably coupled to an exterior of the elongated tubular housing; and
   a casing for a variable speed motor controller wherein the casing is combined with the mount arm.

9. The apparatus as recited in claim 8, wherein the motor is of the low voltage, variable speed, dc motor type.

10. The apparatus as recited in claim 8, wherein an interior of the elongated tubular housing includes a motor mount divider aligned above the midpoint of the elongated tubular housing.

11. The apparatus as recited in claim 8, wherein the housing mount arm includes a clamping end that engages with an external surface of the housing.

12. The apparatus as recited in claim 8, wherein the impeller has inner and outer concentric annular rings with blades mounted between the inner and outer annular rings.

13. The apparatus as recited in claim 12, wherein the blades form nonlinear sloped turbines.

14. An apparatus for reducing formation of ice in an ice fishing hole, the apparatus comprising:
   an elongated tubular housing having an inlet formed in a lower end of the housing and having a plurality of apertures extending through a sidewall of the elongated tubular housing, the plurality of apertures aligned entirely above a midpoint of the elongated tubular housing, the plurality of apertures forming a matrix of rows and columns of apertures that in combination define an outlet of the housing;
   a motor contained within the housing and having a shaft extending from the motor, wherein the motor is affixed in the elongated tubular motor housing entirely above the midpoint and outlet of the housing;
   an impeller coupled to an end of the shaft of the motor, the impeller being positioned within the housing entirely above the inlet of the housing, wherein the impeller has inner and outer concentric annular rings with blades mounted between the inner and outer annular rings;
   a height adjustable housing mount arm removably coupled to an exterior of the elongated tubular housing, wherein the housing mount arm includes a clamping end that engages with an external surface of the housing; and
   a casing for a variable speed motor controller for electrically coupling to the motor.

15. The apparatus as recited in claim 14, wherein the motor is of the low voltage, variable speed, dc motor type.

16. The apparatus as recited in claim 14, wherein an interior of the elongated tubular housing includes a motor mount divider aligned above the midpoint of the elongated tubular housing.

17. The apparatus as recited in claim 14, wherein the blades form nonlinear sloped turbines.

18. The apparatus as recited in claim 1, wherein the matrix of rows and columns includes at least three rows and at least three columns of apertures.

* * * * *